(12) United States Patent
Peng et al.

(10) Patent No.: US 9,443,544 B1
(45) Date of Patent: *Sep. 13, 2016

(54) RECORDING LAYER FOR HEAT ASSISTED MAGNETIC RECORDING

(71) Applicant: Seagate Technology LLC, Cupertino, CA (US)

(72) Inventors: Yingguo Peng, San Ramon, CA (US); Jan-Ulrich Thiele, Sunnyvale, CA (US); Ganping Ju, Pleasanton, CA (US); Thomas Patrick Nolan, Fremont, CA (US); Yinfeng Ding, Fremont, CA (US); Alexander Qihong Wu, Dublin, CA (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 263 days.

This patent is subject to a terminal disclaimer.

(21) Appl. No.: 13/965,976

(22) Filed: Aug. 13, 2013

Related U.S. Application Data

(63) Continuation of application No. 13/174,387, filed on Jun. 30, 2011, now Pat. No. 8,507,114.

(51) Int. Cl.
*G11B 5/66* (2006.01)
*G11B 5/73* (2006.01)

(52) U.S. Cl.
CPC .. *G11B 5/73* (2013.01); *G11B 5/66* (2013.01)

(58) Field of Classification Search
None
See application file for complete search history.

(56) References Cited

U.S. PATENT DOCUMENTS

| | | | |
|---|---|---|---|
| 6,746,749 B2 | 6/2004 | Kirino et al. | |
| 7,521,137 B2 | 4/2009 | Hohlfeld et al. | |
| 7,582,368 B2 | 9/2009 | Berger et al. | |
| 7,588,841 B2 | 9/2009 | Berger et al. | |
| 7,678,476 B2 | 3/2010 | Weller et al. | |
| 7,892,663 B2 | 2/2011 | Nakagawa et al. | |
| 8,507,114 B2* | 8/2013 | Peng et al. | 428/827 |
| 2005/0202287 A1* | 9/2005 | Lu et al. | 428/831.2 |
| 2006/0024432 A1 | 2/2006 | Nolan et al. | |
| 2006/0234091 A1 | 10/2006 | Racine et al. | |
| 2007/0172705 A1 | 7/2007 | Weller et al. | |
| 2009/0040644 A1 | 2/2009 | Lu et al. | |
| 2010/0110577 A1 | 5/2010 | Weller et al. | |
| 2010/0182714 A1 | 7/2010 | Kanbe et al. | |

FOREIGN PATENT DOCUMENTS

| | | |
|---|---|---|
| WO | WO9202931 | 2/1992 |
| WO | WO2010032767 | 3/2010 |

OTHER PUBLICATIONS

International Search Report and Written Opinion dated Sep. 21, 2012 from PCT Application No. PCT/US2012/045020, 11 pages.
File History for U.S. Appl. No. 13/174,387.

* cited by examiner

*Primary Examiner* — Kevin Bernatz
(74) *Attorney, Agent, or Firm* — Hollingsworth Davis, LLC

(57) ABSTRACT

A magnetic stack includes multiple granular layers, at least one of the multiple granular layers is a magnetic layer that includes exchange coupled magnetic grains separated by a segregant having Ms greater than 100 emu/cc. Each of the multiple granular layers have anisotropic thermal conductivity.

20 Claims, 2 Drawing Sheets

RECORDING LAYER FOR HEAT ASSISTED MAGNETIC RECORDING

BACKGROUND

Higher areal storage density for magnetic storage drives can be achieved by decreasing the size of magnetic grains used for magnetic recording media. As grain sizes with a given magnetic anisotropy energy decrease in volume, eventually a stability limit is reached, at which random thermal fluctuations at room temperature result in magnetization reversal and corresponding loss of data reliability.

SUMMARY

A magnetic stack includes multiple granular layers, at least one of the multiple granular layers comprises a magnetic layer including exchange coupled magnetic grains separated by a segregant having Ms greater than 100 emu/cc. Each of the multiple granular layers have anisotropic thermal conductivity.

These and other features can be understood in view of the following detailed discussion and the accompanying drawings.

DETAILED DESCRIPTION

Figure 1:
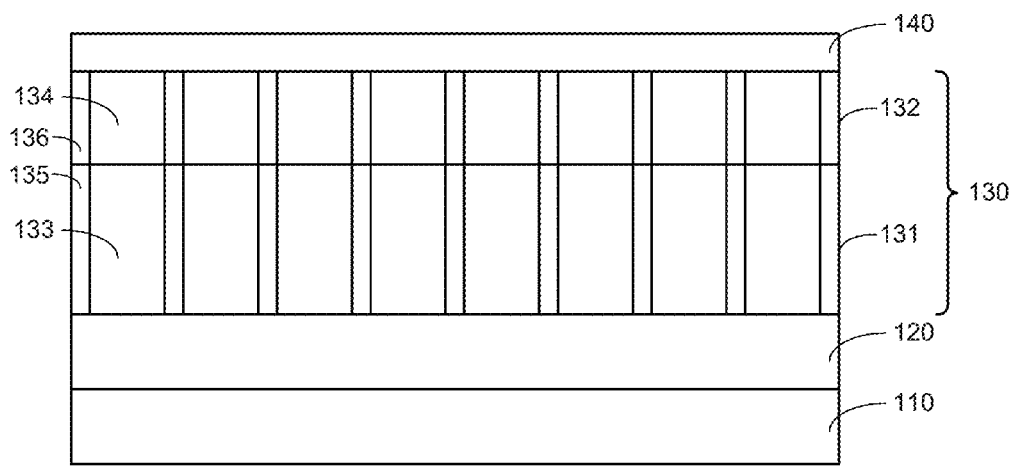
FIG. 1 is a cross sectional diagram showing a magnetic stack having a multiple layer recording layer with anisotropic thermal conductivity in accordance with some embodiments.

To avoid the thermal stability limit, materials having higher magnetic anisotropy energy at room temperature can be used to form the magnetic grains of a magnetic stack. However, writing data to these high magnetic anisotropy materials is more difficult and some type of energy assistance may be used to temporarily reduce the magnetic anisotropy energy of the materials while a magnetic write field is applied. For example, one form of energy assisted magnetic recording involves laser light applied to the magnetic medium in synchrony with the writing magnetic field. The laser light heats the magnetic material to locally lower the magnetic anisotropy of the medium, thus allowing the writing of data by the writing field before the local region cools back to ambient temperature. The use of heat assisted magnetic recording (HAMR) involves materials and structures of the magnetic medium that can accommodate the relatively high temperatures involved in the writing process as well as have magnetic properties suitable for HAMR.

High signal to noise ratio (SNR) magnetic recording media, may involve small uniformly sized magnetic particles or grains; and a moderately low, uniform exchange coupling between the particles or grains. For longitudinal, perpendicular and tilted magnetic recording media, an acceptable exchange coupling value may be different, but for each case, a uniform, moderate value may exist between each neighboring grain.

Generally, low exchange coupling is desired so that magnetic switching of neighboring grains does not become too highly correlated. Reducing exchange coupling decreases the size of the magnetic cluster or magnetic switching unit. Cross-track correlation length and media noise are correspondingly reduced. However, near-zero exchange coupling between magnetic grains produces a very low squareness sheared hysteresis loop, a broad switching field distribution, less resistance to self demagnetization and thermal decay, and low nucleation field (Hn) in perpendicular media designs. Non-uniform exchange coupling allows some grains to act independently while other grains act in clusters, resulting in broad distributions of magnetic cluster size and anisotropy field.

Adjusting deposition parameters in an attempt to achieve a recording layer that has an amount of non-ferromagnetic material that is sufficient to significantly, but not completely exchange decouple the magnetic particles can be challenging. One problem arises because the exchange between two grains is extremely sensitive to the arrangement of a very small number of atoms. Thus, some grains are much more strongly coupled than others. Additionally, radial diffusion profiles depend upon the size of the grains. Thus, larger grains can have systematically different composition than smaller grains, and hence have systematically different exchange coupling and magnetic anisotropy. Furthermore, the composition of the entire film including the ferromagnetic particles, the weakly exchange coupled ferromagnetic regions between magnetic particles, and the exchange decoupling non-ferromagnetic regions between magnetic particles is substantially the same, except for the preferential transport of some atomic species. Changing exchange coupling in the film generally changes the composition of the magnetic particles as well as the grain boundary material. Thus, it is difficult to separately optimize the properties of each component of the film.

Embodiments of the invention comprise a magnetic recording media suitable for HAMR applications that includes a magnetic recording layer that has multiple magnetic layers. One of the multiple layers is more strongly exchange coupled than another of the multiple layers. Both magnetic layers comprise crystalline grains separated by segregant material. The magnetic layer that has weaker exchange coupling has sufficient non-ferromagnetic segregant between magnetic grains so that exchange coupling is relatively low. The magnetic layer that is more strongly exchanged coupled has relatively high exchange coupling such that substantially all of the magnetic grains are strongly exchange coupled. The strongly exchange coupled magnetic layer has a ferromagnetic segregant between the magnetic grains.

In some implementations, the strongly exchange coupled and weakly exchanged coupled magnetic layers may be adjacent in the film stack so that grains in the weakly exchanged coupled magnetic layer are moderately exchange coupled by a pathway through the strongly exchanged coupled magnetic layer. That is, exchange coupling between grains in the weakly coupled magnetic layer is increased toward a moderate value by their coupling connection through the strongly coupled magnetic layer.

When used in conjunction with HAMR, these magnetic recording layers have additional constraints of accommodating local heating and reducing heat transfer to neighboring regions which may disturb previously written data.

Embodiments discussed in this disclosure involve structures and materials configured to provide switching field, switching field distribution, thermal stability, heat transfer and other characteristics within acceptable limits for HAMR media. FIG. 1 illustrates a cross sectional view of a magnetic stack in accordance with some embodiments. The magnetic stack includes a substrate 110 and may optionally include one or more interlayers 120 between the substrate 110 and the magnetic recording layer 130. One or more overcoat layers 140 may optionally be disposed on the magnetic recording layer 130.

The substrate 110 may be made of any suitable material, such as ceramic glass, amorphous glass, or NiP coated Al—Mg alloy. The one or more interlayers 120 may include an orientation layer, a heat sink layer, and/or a soft underlayer (SUL). If a heat sink is used, it may have a thickness from about 10 to about 1.00 nm, and may be made of any suitable material, such as Cu, Ag, Al, Au, CuZr, or other material having high thermal conductivity. If an SUL is used, it may have a thickness from about 5 to about 50 nm, and may be made of any suitable soft magnetic material. Some representative, non-limiting SUL materials are alloys including CoFe, FeCoB, FeAlN, FeAlSi, NiFe, CoZrNb or FeTaN. The heat sink layer, SUL, orientation layer and/or overcoat may comprise multiple layers.

The magnetic recording layer comprises at least two layers 131, 132. The first magnetic recording layer 131 is a granular structure comprising first magnetic grains or particles 133 and a first segregant 135 at the grain boundaries of the first magnetic grains 133. The term "granular layer" denotes an arrangement of crystalline cores with grain boundaries, wherein the crystalline cores are separated from one another by a material at the grain boundaries. A granular layer comprises a two phase structure with the crystalline cores as a first phase and the material that separates the crystalline cores as a second phase. The first phase has a physically distinct microstructure or composition when compared to the second phase material, which may be amorphous, polycrystalline, and/or crystalline. The second magnetic recording layer 132 is also a granular structure comprising second magnetic grains or particles 134 and a second segregant 136 at the grain boundaries of the second magnetic grains 134. The first segregant 135 has low or no magnetic moment, and magnetically decouples the first magnetic grains 133 of the first magnetic layer 131 from each other. The second segregant 136 has higher magnetic moment and may be thinner than first segregant 135, and does not fully magnetically decouple the second magnetic grains 134 of the second magnetic layer 132 from each other. Any decoupling provided by the second segregant 136 for the second magnetic grains 134 is less than the decoupling provided by the first segregant 135 for the first magnetic grains 133. For example, the second segregant 136 may provide negligible decoupling between the second magnetic grains 134. The first and/or second segregant may be an amorphous material. The term "amorphous" means that such a material exhibits no sharp peak in a θ-2θ X-ray diffraction pattern as compared to background noise. Amorphous materials may encompass nanocrystallites in amorphous phase or any other form of a material so long the material exhibits no peak in an X-ray diffraction pattern as compared to background noise.

The amount of lateral exchange decoupling between grains within the first and second recording layers 131, 132 may differ. For example, as discussed in an example below, the grains 134 of the second magnetic recording layer 132, which in FIG. 1 is farthest from the substrate 110, may be less exchange decoupled than the grains 133 of the first magnetic recording layer 131. However, in other implementations, the reverse situation may hold, wherein the grains of the second recording layer are more exchange decoupled than the grains of the first recording layer.

The amount of exchange coupling between the magnetic grains of a magnetic layer may be described in terms of an exchange field (Hex) which is a measure of the magnetic interaction between neighboring grains. In some embodiments, the first magnetic layer 131 has an exchange field, $Hex_1$, that is different from the exchange field of the second magnetic layer, $Hex_2$. For example, the first magnetic layer may be more exchange decoupled than the second magnetic layer, such that $Hex_1 < Hex_2$.

Completely decoupled grains would have an exchange field, Hex=0 Oe, and have a highly sheared hysteresis loop owing to the demagnetization field, $(1-N)*4*\pi*Ms$, where N is the self demagnetization factor and Ms is the saturation moment. Thus, for Hex=0, the sheared hysteresis loop makes the nucleation field (Hn) much smaller than the coercive field (Hc) so that the quantity Hc−Hn is large. Media with strongly coupled grains all tend to reverse together at about the same applied field, so that the hysteresis loop is very square and Hc−Hn is small. Larger values of the quantity Hc−Hn correspond to lower exchange coupling. An approximation of exchange field is given by the equation $Hex=((1-N)*4*\pi*Ms)-(Hc-Hn)$. N has a value between 0.1 and 0.5 for most HAMR media designs. Values of Hc, Hn and Hex provided in examples below are room temperature values.

The approximate shape of a hysteresis loop including Hc−Hn of a decoupled granular layer with Hex~0 can be estimated from basic media layer parameters including thickness, grain size, and Ms. Decoupled layer Hc−Hn values may vary from less than 5 kOe to more than 15 kOe. In each case, for the specified basic media average layer parameters, Hc−Hn is reduced from the decoupled granular layer value as the percentage or thickness of coupled second layer material is increased, thereby raising the average Hex of the composite structure.

In one example, the first magnetic layer 131 has first magnetic grains 133 separated by a first segregant 135 with comprises a non-magnetic oxide. The first magnetic layer 131 has Hc of about 30 kOe and Hn of about 20 kOe, resulting in an Hc−Hn of about 10 kOe. In this example, the first magnetic layer 131 has a thickness of about 8 nm, with grain sizes suitable for HAMR applications, e.g., grain diameters of about 2 nm to about 15 nm. The second magnetic layer 132 has second magnetic grains 134 separated by a magnetic oxide 136. The second magnetic layer 132 may have a thickness of about 3 nm with grain diameters of about 2 nm to about 15 nm, and stronger exchange coupling between the grains 134 when compared to the exchange coupling between the grains 133 of the first magnetic layer 131. This example arrangement of first and second magnetic layers 131, 133 may reduce Hc−Hn of the magnetic recording layer 130 to about 5 kOe, for example.

In other embodiments, a wide range of coercivities and loop shearing levels are consistent with intermediate Hex values formed by a combination of one magnetic layer that is an exchange decoupled layer having a relatively low Hex value and another magnetic layer having a relatively high Hex value.

In one example, the first magnetic layer 131 includes first magnetic grains 133 separated by a first segregant 135 with comprises a non-magnetic oxide. The Hex value of the first magnetic layer 131, $Hex_1$, is below about 2 kOe. The second magnetic layer 132 includes second magnetic grains 134 separated by a second segregant 136 which comprises a magnetic oxide. The second magnetic layer 132 has a Hex value, $Hex_2$, which is larger than $Hex_1$. The combination of the first and second magnetic layers 131, 132 in this example provides a combined magnetic layer having an intermediate Hex value between 3 kOe-10 kOe.

In various implementations, the more decoupled layer having the non-magnetic segregant has Hex less than about 4 kOe, or even less than about 3 kOe, and the more coupled layer having the magnetic segregant has Hex greater than about 4 kOe, or greater than 5 kOe, or even greater than 10 kOe.

Exchange field, Hex, of a magnetic layer is a function of the magnetic properties of the segregant. For example, with other parameters being held equal, a segregant material that has a relatively higher magnetic moment, Ms, provides more exchange coupling than a material that has a relatively lower magnetic moment. In some cases, the magnetic moment of the non-magnetic segregant 135 may be negligible (e.g., less than about 100 emu/cc) whereas the magnetic moment of the magnetic segregant 136 may be greater than about 100 emu/cc.

Examples discussed above involve the arrangement in which the first magnetic layer has a non-magnetic segregant and is more decoupled than the second magnetic layer, which has a magnetic segregant. In some cases, the opposite arrangement may occur. The grains 133 of the first magnetic layer 131 may be separated by a magnetic segregant 135 and the grains 134 of the second magnetic layer 132 may be separated by a non-magnetic segregant 136 such that the first magnetic layer 131 is the more magnetically coupled layer and the second magnetic layer 132 is less magnetically coupled.

In either case, there is vertical interlayer magnetic coupling between the grains of the first layer and those of the second layer. This interlayer coupling serves to increase the effective volume of the grains, thereby increasing thermal stability of layers 131, 132. The interlayer coupling allows the grains to switch more coherently, thereby reducing the SFD of the magnetic stack.

The grains of the first magnetic layer 131 and/or the second magnetic layer 132 may comprise FePt, FeXPt alloy, FeXPd alloy, $Co_3Pt$, CoXPt alloy, CoX/Pt multilayer, CoXPd alloy, CoX/Pt multilayer, 3D transition metal-rare earth alloys such as CoSm alloys, and/or other materials. The grains of materials such as FePt, FeXPt alloy, FeXPd alloy, $Co_3Pt$, CoXPt alloy, and CoXPd alloy may comprise ordered alloys to increase their room temperature anisotropy. The segregant 135 of the first magnetic layer 131 comprises a non-magnetic material, such as carbon or an alloy containing carbon, an alloy containing boron, a non-magnetic oxide, e.g., oxides that do not include a substantially amount of Co, Ni or Fe. For example, C, $SiO_2$, $TiO_2$, $Ta_2O_5$, BN, $B_4C$, MgO, silicon carbide, silicon nitride, etc. may be used as a non-magnetic segregant. The segregant 136 of the second magnetic layer 132 comprises a magnetic material, such as magnetic oxides and/or nitrides, e.g., magnetic oxides or nitrides of iron, nickel or cobalt. For example, $Fe_xO_y$ or $Fe_xN_y$ may be used as a magnetic segregant, where x and y represent the relative amounts of each component in the material.

The first magnetic layer 131 and/or the second magnetic layer may have a thickness in a range between about 1 nm and about 15 nm, or a range of about 4 nm to about 10 nm, or a range of about 3 to about 8 nm. The average diameter of the grains of the first and/or second magnetic layers may range from about 2 nm to about 15 nm or may range from about 5 nm to about 10 nm. The amount of magnetic segregant in the second magnetic layer may be in a range of about 5% to about 50% by volume, or in a range of about 15% to about 35%. The amount of non-magnetic segregant in the first magnetic layer may be in a range of about 5% to about 50% by volume, or in a range of about 15% to about 35%. The average thickness of the segregant between the magnetic grains in the first and/or second magnetic layer may be in a range of about 0.5 nm to about 2.0 nm.

The materials used in the first and second magnetic layers 131, 132 may be selected so that the thermal conductivies of the layers 131, 132 are anisotropic. During a HAMR write operation, lateral heat flow away from the heated area being written can cause errors in previously written data in areas of the stack adjacent to the heated area due to thermally induced magnetization reversals in adjacent areas. The thermal properties of the segregants 135, 136 may be selected to control the lateral heat flow, also known as thermal blooming, propagating from the heated area in HAMR.

Figure 2:
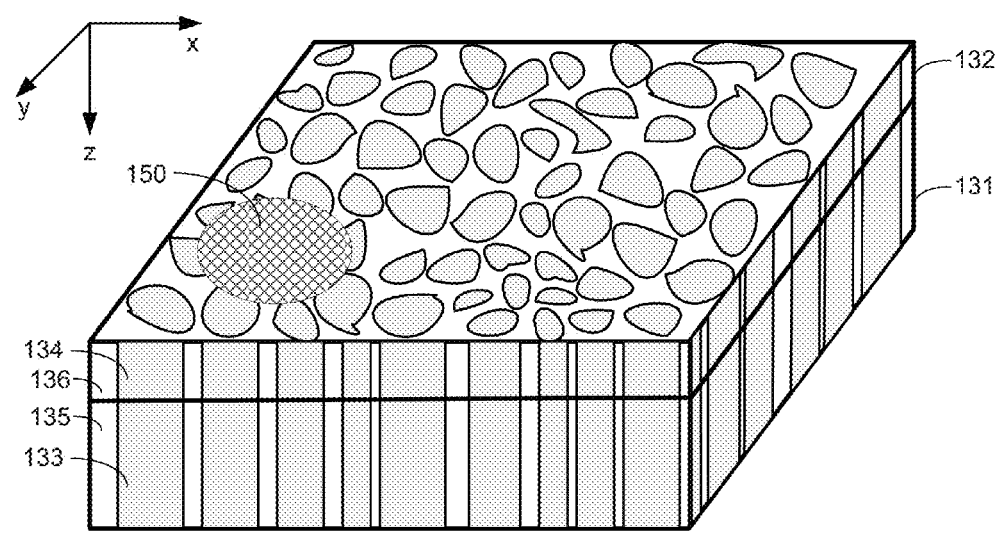
FIG. 2 is an isometric view of the multiple layer recording layer of FIG. 1.

FIG. 2 is an isometric view of the dual magnetic layers 131, 132 presented here to facilitate discussion of the thermal properties of these layers. Note that FIG. 2, like others in this disclosure is not to scale and provides an exaggerated view of the recording layers to illustrate certain aspects. Each layer 131, 132 includes grains 133, 134, which are represented in FIG. 2 by the shaded regions that extend through the thickness of the layers 131, 132. As shown in FIG. 2, the grains 133 of the first layer 131 may generally align with the grains 134 of the second layer 132, although this is not always the case. Segregant material 135, 136 represented by non-shaded regions in FIG. 2, is disposed in between the first layer grains and the second layer grains. The thermal conductivity of the segregant material 135, 136 is lower than the thermal conductivity of the grains, resulting in anisotropy in the thermal conductivity of the recording layers 131, 132. Heat transfer from the heated area 150 near the laser spot in the x and y directions is impeded by the relatively low thermal conductivity of the segregant material 135, 136, whereas heat transfer in the z direction occurs through the relatively high thermal conductivity grains 133, 134.

Thermal conductivity of the segregant 135 of the first layer 131 and the segregant 136 of the second layer 132 may be less than about 5 Watts/mK. Thermal conductivity of the magnetic grains 133, 134 may be greater than 5 Watts/mK, or greater than about 10 Watts/mK. Along the x and y directions, in addition to the material thermal conductivities of the segregant and magnetic grains that make up the magnetic layers, the thermal conductivities of the first and second magnetic layers can also be affected by the contact resistance between the segregant and the metal alloy of the magnetic grains. The overall thermal conductivity of the first and second magnetic layers in the x or y directions may be less than about 5 Watts/mK. The overall thermal conductivity of the first and second magnetic layers in the z direction is predominantly determined by the thermal conductivities of the magnetic grains 133, 134, which may be greater than about 5 Watts/mK or greater than about 10 Watts/mK.

Figure 3:
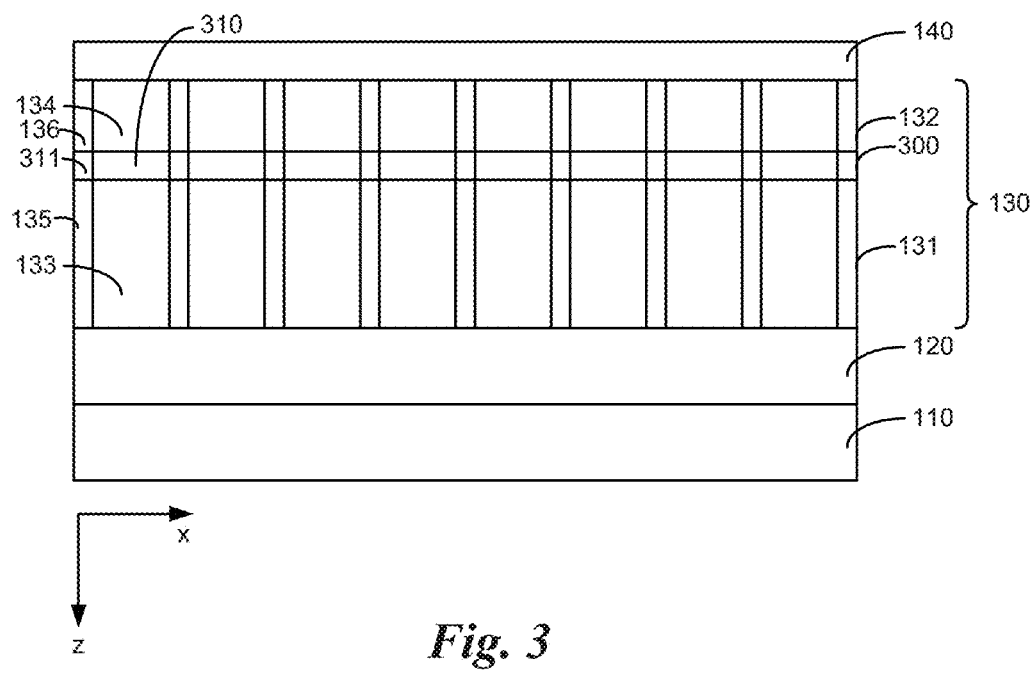
FIG. 3 is a cross sectional diagram illustrating a structure incorporating multiple granular layers providing anisotropic thermal conductivity in accordance with some embodiments.

In some implementations, the magnetic stack may include one or more additional magnetic or non-magnetic layers, as illustrated by layer 300 in FIG. 3. In FIG. 3, layer 300 is shown disposed between the first and second magnetic layers. Alternatively or additionally, the one or more additional layers may be disposed over the first and second magnetic layers 131, 132 (farther from the substrate 110), and/or may be disposed under the first and second magnetic layers 131, 132 (nearer to the substrate 110). The one or more additional layers 300 comprise a material composition and/or structure providing anisotropic thermal conductivity with preferential heat flow normal to the surface of the magnetic stack (z direction) and limited lateral heat flow (x and y directions).

Turning back to FIG. 3, regardless of their specific location in the stack, the one or more additional layers 300 may have a granular structure with relatively high thermal conductivity grains 310 separated by relatively lower thermal conductivity segregant 311. The grains 310 of the additional layers 300 may be magnetically coupled or decoupled and the grains 310 and/or segregant 311 may comprise magnetic or non-magnetic materials.

As shown in FIG. 3, the additional layer 300 is compatible crystallographically with the magnetic layers 131, 132 above and below the additional layer 300. In this arrangement, additional layer 300 may assist in initiating good crystallographic growth of the second magnetic layer 132. In various implementations, the additional magnetic layer 300 may be magnetic or non-magnetic and does not compromise the vertical coupling between the first and second magnetic layers 131, 132. When located between the first and second magnetic layers 131, 132 as shown in FIG. 3, the additional magnetic layer 300 may be sufficiently thin and/or may have sufficient Ms so that the vertical coupling between the first and second magnetic layers 131, 132 is not eliminated.

Figure 4:
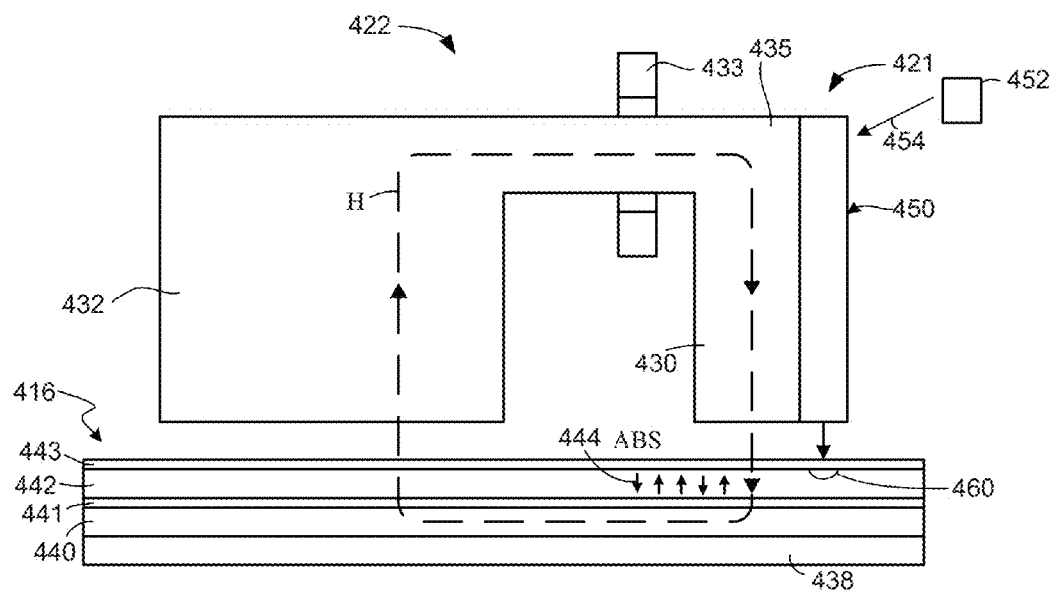
FIG. 4 is a schematic illustration of a heat assisted magnetic recording apparatus incorporating a magnetic stack in accordance with some embodiments.

FIG. 4 illustrates a recording apparatus that incorporates one or more of the magnetic stacks illustrated herein. FIG. 4 provides a schematic side view of a HAMR recording head 422 and a magnetic recording medium 416. Although an embodiment of the invention is described herein with reference to recording head 422 as a perpendicular magnetic recording head and the medium 416 as a perpendicular magnetic recording medium, it will be appreciated that aspects of the invention may also be used in conjunction with other types of recording heads and/or recording mediums where it may be desirable to employ heat assisted recording. The head 422 may include a writer section comprising a main write pole 430 and a return or opposing pole 432 that are magnetically coupled by a yoke or pedestal 435. The head 422 may be constructed with a write pole 430 only and no return pole 432 or yoke 435. A magnetization coil 433 may surround the yoke or pedestal 435 for energizing the head 422. The HAMR head 422 may also include a read portion, not shown. The recording medium 416 is positioned adjacent to or under the recording head 422. Relative movement occurs between the head and the medium 416.

As illustrated in FIG. 4, the recording head 422 also includes a structure 421 for heating the magnetic recording medium 416 proximate to where the write pole 430 applies the magnetic write field H to the recording medium 416. The medium 416 includes a substrate 438, one or more interlayers, e.g., heat sink layer 440, seed layer 441, a magnetic recording layer 442, and an overcoat/protective layer 443. A magnetic field H produced by current in the coil 433 is used to control the direction of magnetization of bits 444 in the recording layer of the medium.

The structure 421 for heating the medium 416 may include, for example, a planar optical waveguide 450. A laser diode 452, or other source of electromagnetic radiation, directs light 454 to the planar waveguide 450 which transmits the light to a small spot adjacent to an air bearing surface (ABS). A near-field transducer (NFT) can be included to further concentrate the light. The near-field transducer is designed to reach a local surface plasmon (LSP) condition at a designated light wavelength. At LSP, a high field surrounding the near-field transducer appears, due to collective oscillation of electrons in the metal. Part of the field will tunnel into an area 460 of the adjacent media and get absorbed, raising the temperature of the media locally for recording.

The examples provided in this disclosure illustrate magnetic stacks that include recording layers having multiple magnetic layers in which each layer individually (and all collectively) have anisotropic thermal conductivity. Some of the layers may be granular in structure with exchange coupling between the grains. Some of the layers may be granular in structure with substantially exchange decoupled grains. The concept can be extended such that a majority or substantially all of the magnetic layers (recording layers or interlayers) in the stack above a heat sink layer may exhibit anisotropic thermal conductivity. These layers can have relatively high thermal conductivity in a direction normal to the surface of the magnetic stack but have relatively limited thermal conductivity in the plane of the magnetic stack. Such structures serve to reduce heat transfer from the heated area of the stack to adjacent areas of the recording layer, preventing transferred heat from disturbing previously written data in adjacent areas.

It is to be understood that even though numerous characteristics of various embodiments have been set forth in the foregoing description, together with details of the structure and function of various embodiments, this detailed description is illustrative only, and changes may be made in detail, especially in matters of structure and arrangements of parts illustrated by the various embodiments to the full extent indicated by the broad general meaning of the terms in which the appended claims are expressed.

What is claimed is:

1. A magnetic stack suitable for use in magnetic storage, comprising:
    a first granular magnetic layer including first magnetic grains separated by a first segregant, the first segregant comprising a non-magnetic material; and
    a second granular magnetic layer including second magnetic grains separated by a second segregant, the second segregant comprising a magnetic material, wherein the first and second magnetic layers have anisotropic thermal conductivity, wherein a thermal conductivity component of the first and second magnetic layers that is normal to a surface of the magnetic stack is at least two times greater than a thermal conductivity component of the first and second magnetic layers that is parallel to the surface of the stack.

2. The magnetic stack of claim 1, wherein the second segregant has thermal conductivity less than about 5 Watts/mK and $M_s$ greater than about 100 emu/cc.

3. The magnetic stack of claim 1, wherein at least one of the first magnetic grains and the second magnetic grains comprise an Fe alloy.

4. The magnetic stack of claim 1, wherein the second segregant comprises an oxide or nitride of Fe, Ni or Co.

5. The magnetic stack of claim 1, wherein the first segregant comprises carbon or a non-magnetic oxide.

6. The magnetic stack of claim 1, wherein an exchange field, $Hex_1$, of the first magnetic layer is less than an exchange field, $Hex_2$, of the second magnetic layer.

7. The magnetic stack of claim 1, wherein the first and second magnetic grains have diameters less than about 15 nm.

8. The magnetic stack of claim 1, wherein the component of the thermal conductivity of the first and second magnetic layers that is normal to a surface of the magnetic stack is greater than about 5 Watts/mK and the component of the thermal conductivity of the first and second magnetic layers that is parallel to the surface of the magnetic stack is less than about 5 Watts/mK.

9. A magnetic stack suitable for use in magnetic storage, comprising:
- a first magnetic layer comprising first magnetic grains separated by a first segregant having a first Ms; and
- a second magnetic layer comprising second magnetic grains separated by a second segregant having a second Ms, the second Ms being greater than the first Ms, wherein a thermal conductivity component of the first and second magnetic layers that is normal to a surface of the magnetic stack is at least two times greater than a thermal conductivity component of the first and second magnetic layers that is parallel to the surface of the stack.

10. The magnetic stack of claim 9, wherein the thermal conductivity component that is normal to the surface of the stack is greater than about 10 Watts/mK and the thermal conductivity component that is parallel to the surface of the stack is less than about 5 Watts/mK.

11. The magnetic stack of claim 9, wherein the thermal conductivity component that is normal to the surface of the stack is greater than about 5 Watts/mK and the thermal conductivity component that is parallel to the surface of the stack is less than about 5 Watts/mK.

12. The magnetic stack of claim 9, wherein a thickness of one or both of the first and second magnetic layers is in a range of about 3 nm to about 8 nm.

13. A magnetic stack suitable for use in magnetic storage, comprising multiple granular layers, at least one of the multiple granular layers comprising a magnetic layer including exchange coupled magnetic grains separated by a segregant having Ms greater than 100 emu/cc, each of the multiple granular layers having anisotropic thermal conductivity wherein a thermal conductivity component of the multiple granular layers that is normal to a surface of the magnetic stack is at least two times greater than a thermal conductivity component of the multiple granular layers that is parallel to the surface of the stack.

14. The magnetic stack of claim 13, wherein at least one of the multiple granular layers comprises a magnetic layer including exchange decoupled magnetic grains separated by a segregant having Ms less than 100 emu/cc.

15. The magnetic stack of claim 14, wherein at least one of the multiple granular layers comprises an additional granular layer disposed between the magnetic layer having the exchange decoupled magnetic grains and the magnetic layer having the exchange coupled magnetic grains.

16. The magnetic stack of claim 13, wherein the thermal conductivity component that is normal to a surface of the stack is greater than about 10 Watts/mK and the thermal conductivity component that is parallel to a surface of the stack is less than about 5 Watts/mK.

17. The magnetic stack of claim 13, wherein the thermal conductivity component that is normal to a surface of the stack is greater than about 5 Watts/mK and the thermal conductivity component that is parallel to a surface of the stack is less than about 5 Watts/mK.

18. The magnetic stack of claim 13, wherein the segregant comprises an oxide of Fe, Ni or Co.

19. The magnetic stack of claim 13, wherein the segregant comprises a nitride of Fe, Ni or Co.

20. The magnetic stack of claim 13, wherein the magnetic grains have diameters less than about 15 nm.

* * * * *